Aug. 30, 1949. A. R. LOFSTRAND 2,480,150
GLASSWARE WASHING MACHINE
Filed Aug. 19, 1943 6 Sheets-Sheet 2
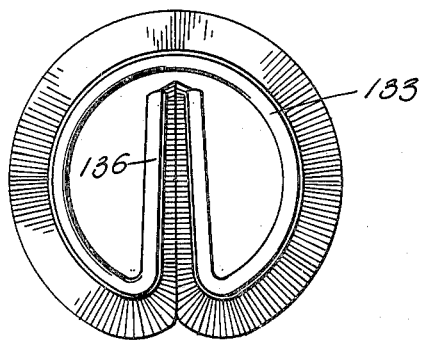
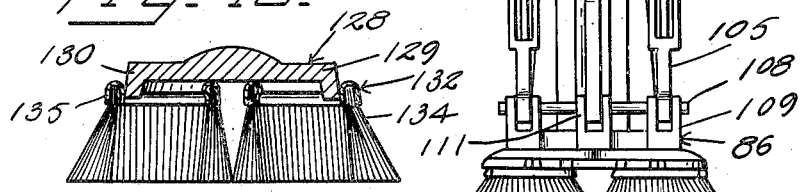
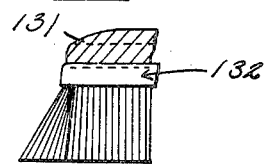
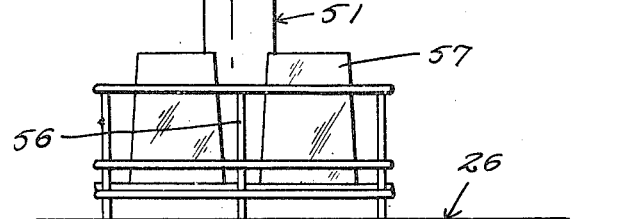
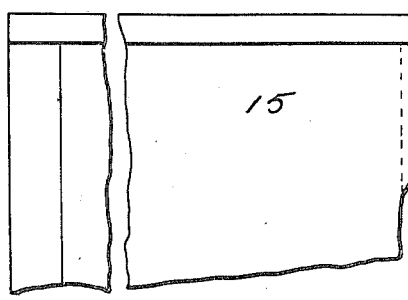
Inventor
Anders R. Lofstrand
By Kimmel & Crowell
Attorneys

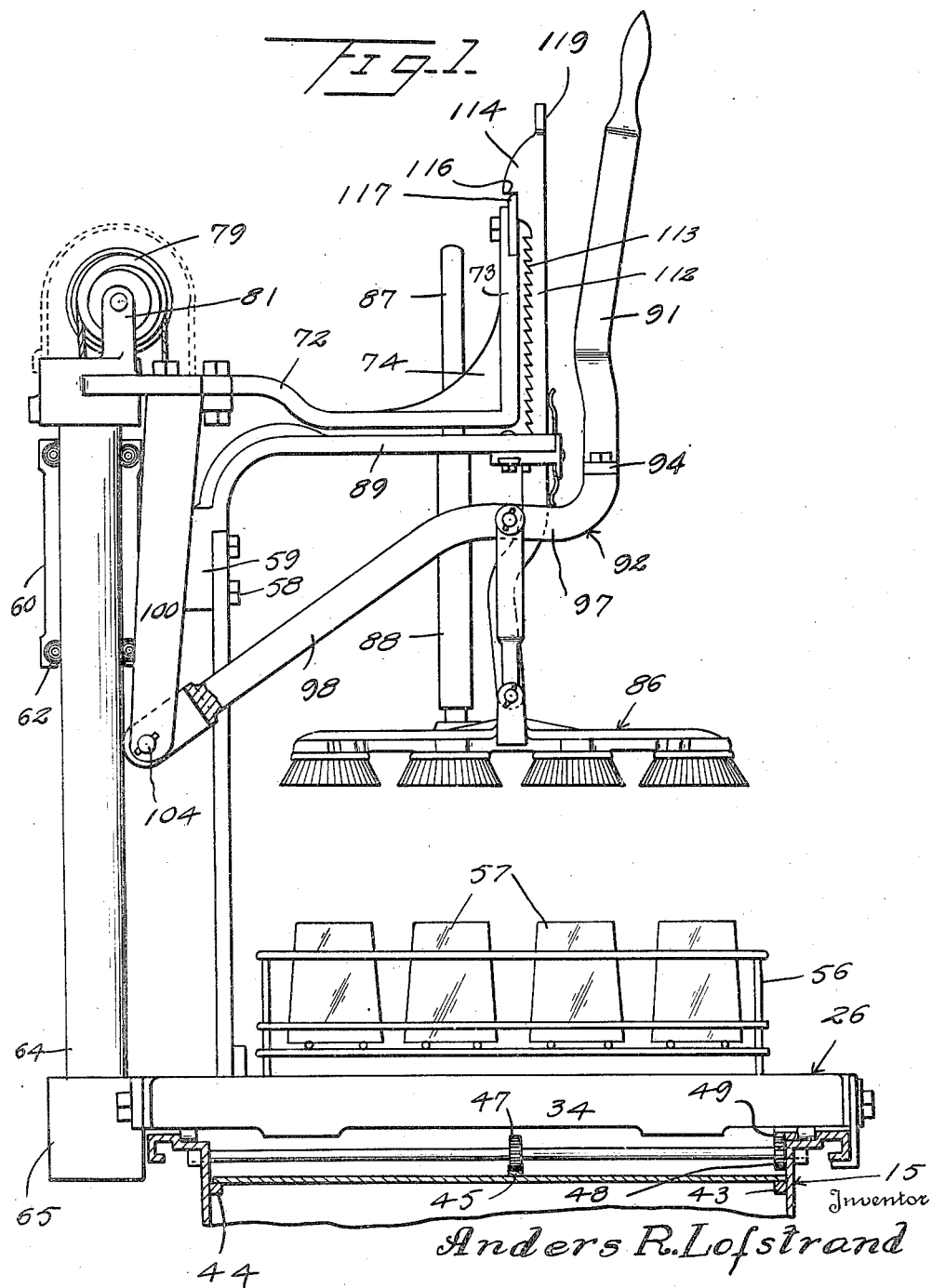

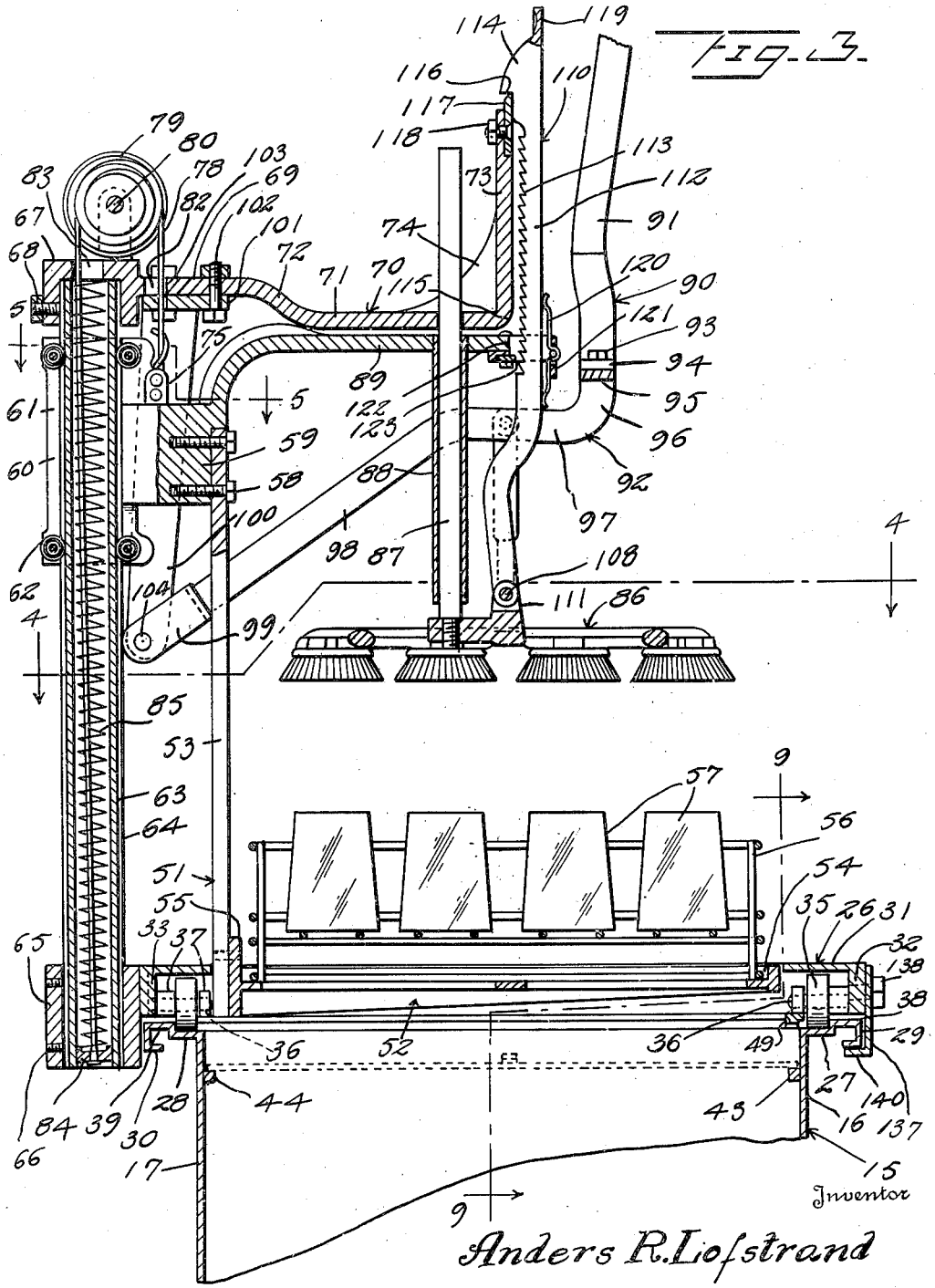

Aug. 30, 1949.　　　　　A. R. LOFSTRAND　　　　　2,480,150
GLASSWARE WASHING MACHINE
Filed Aug. 19, 1943　　　　　　　　　　　　　　6 Sheets-Sheet 4
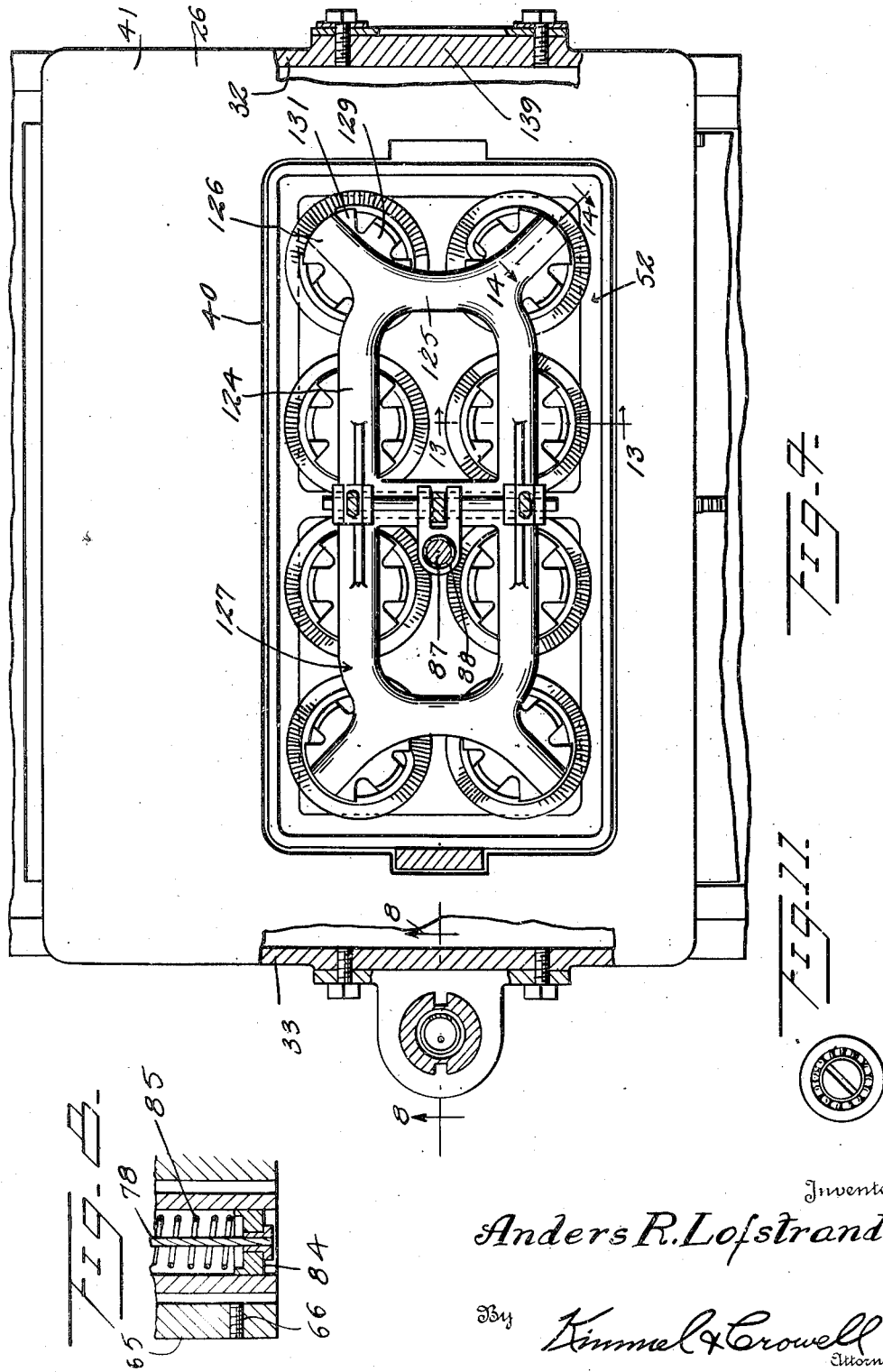

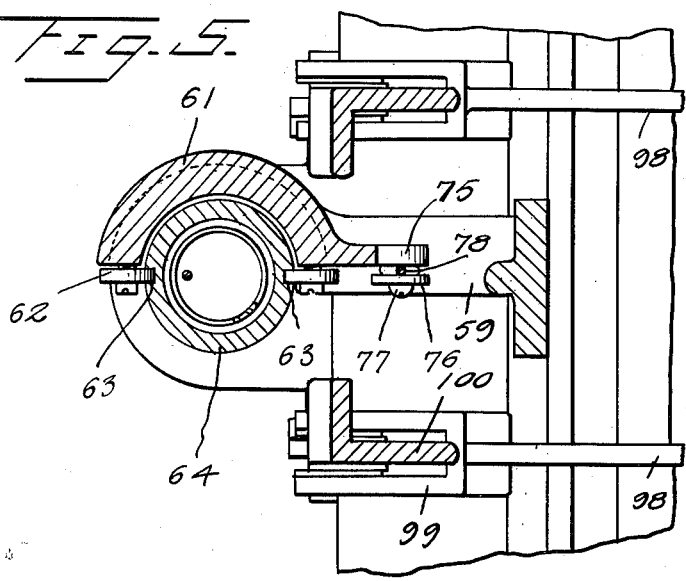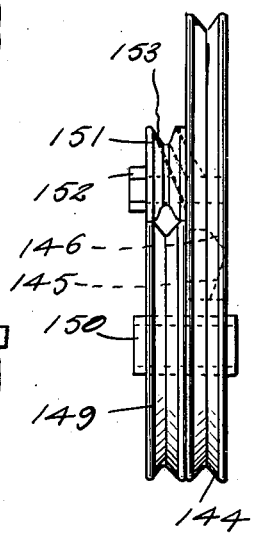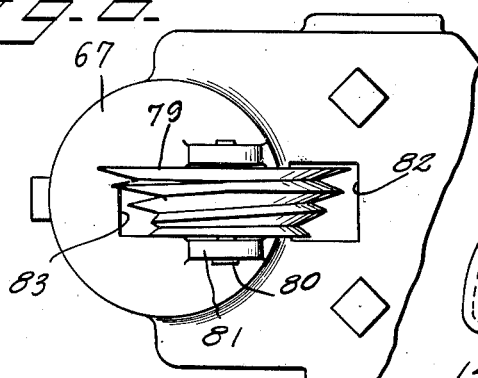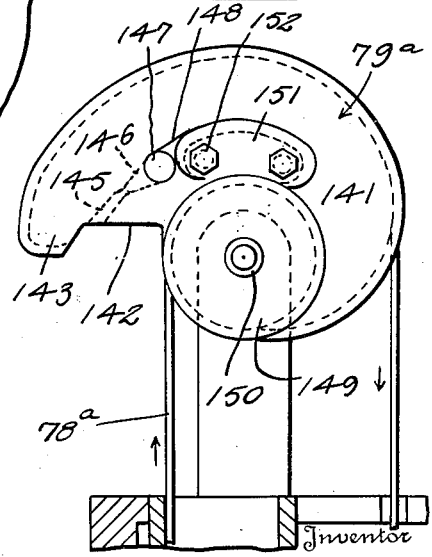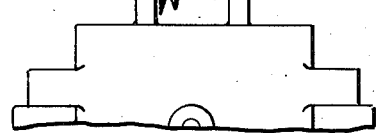

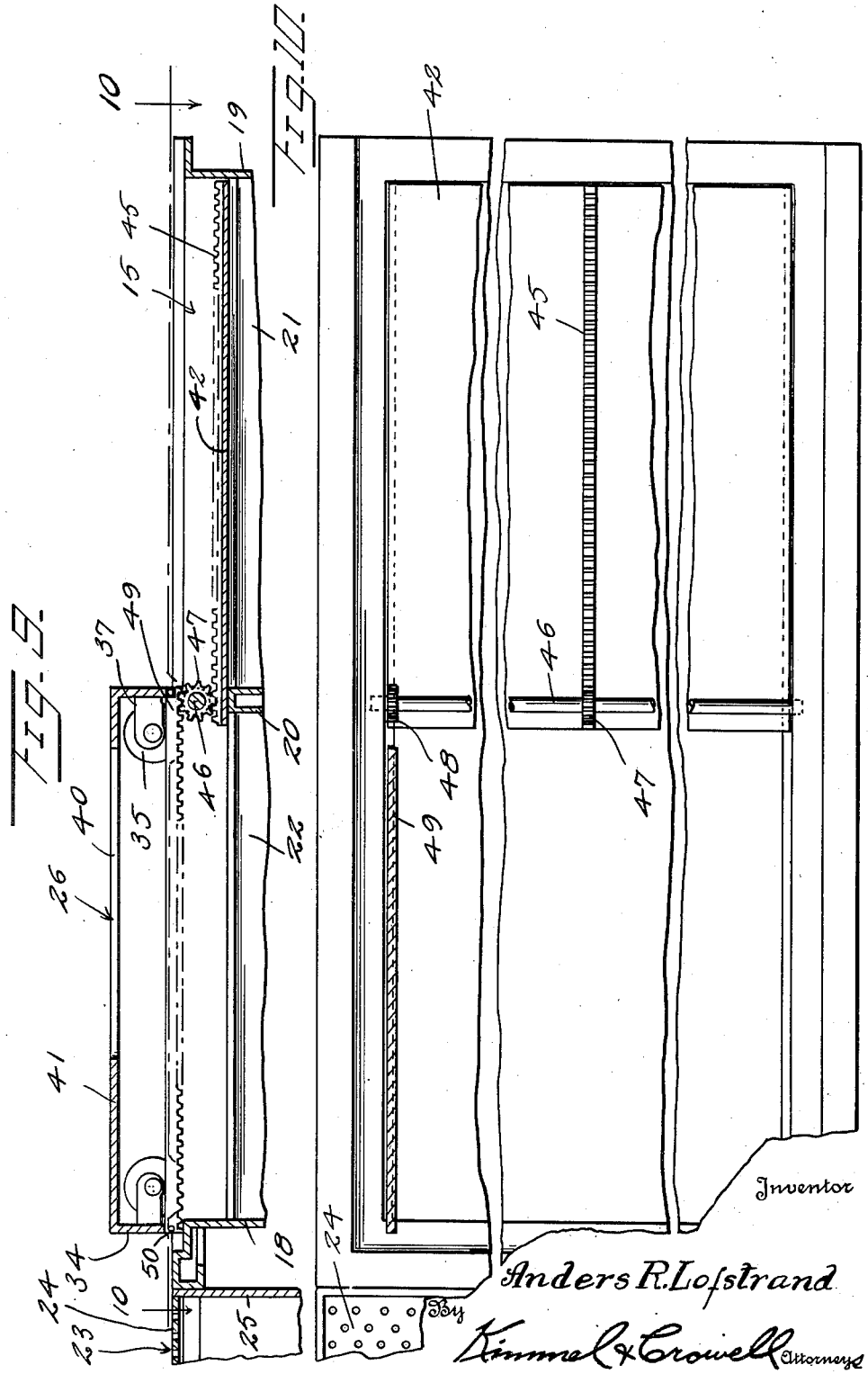

Patented Aug. 30, 1949

2,480,150

UNITED STATES PATENT OFFICE 2,480,150

GLASSWARE WASHING MACHINE

Anders Rudolf Lofstrand, Silver Spring, Md.

Application August 19, 1943, Serial No. 499,271

5 Claims. (Cl. 134—76)

This invention relates to improvements in glassware washing machines and is an improvement over the washing machines embodied in prior Patents Numbers 1,992,920 issued February 26, 1935 and 2,052,835, issued September 1, 1936.

An object of this invention is to provide an improved glassware washing machine which is designed particularly for use in washing tumblers which are positioned in a wire basket.

Another object of this invention is to provide a machine of this kind including a vertically movable elevator adapted to support the tumblers or glassware, the elevator being substantially balanced so as to eliminate any undue weight in the operation of the machine.

A further object of this invention is to provide a machine of this kind which includes an upper brush carrier adapted to be initially lowered to an operative position and releasably locked in this position to provide means for brushing the bottoms of the tumblers during the washing operation.

A further object of this invention is to provide, in a machine of this kind, an improved tub structure which includes a pair of compartments and a closure therefor, the closure being automatically shiftable in a direction opposite from the shifting of the tumbler carrier so that the latter can readily be lowered into or raised from the desired compartment and the closure may, if desired, be used for drying or draining of the washed articles.

A further object of this invention is to provide an improved means in the form of a compensating structure for compensating or equalizing the tension on the elevator, and the operating lever as the lever is rocked to lower the elevator into the desired washing compartment or to raise the elevator from the compartment.

With the foregoing and other objects in view, the invention consists of the novel construction, combination and arrangement of parts, as will be hereinafter more particularly described, and as illustrated in the accompanying drawings wherein is shown an embodiment of this invention, but it is to be understood that such changes and variations may be made as come within the scope of the claims, without departing from the invention.

In the drawings:

Figure 1 is a detail side elevation, partly broken away and in vertical section, of a glassware or tumbler washing machine constructed according to an embodiment of this invention;

Figure 2 is a detail front elevation, partly broken away, of the machine;

Figure 3 is a vertical sectional view, taken substantially on the line 3—3 of Figure 2;

Figure 4 is a sectional view, taken on the line 4—4 of Figure 3;

Figure 5 is a sectional view taken on the line 5—5 of Figure 3;

Figure 6 is a fragmentary top plan of the rear upper portion of the device;

Figure 7 is a detail rear elevation of the upper rear portion of the device;

Figure 8 is a fragmentary sectional view taken on the line 8—8 of Figure 4;

Figure 9 is a sectional view taken on the line 9—9 of Figure 3;

Figure 10 is a sectional view taken on the line 10—10 of Figure 9;

Figure 11 is a detail side elevation of one of the rollers for the lower carriage;

Figure 12 is a detail top plan of one of the brush members;

Figure 13 is a sectional view taken on the line 13—13 of Figure 4; and

Figure 14 is a fragmentary sectional view taken on the line 14—14 of Figure 4.

Fig. 15 is a side elevation of a modified form of pulley.

Fig. 16 is an end elevation of the pulley in Figure 15.

Referring to the drawing, the numeral 15 designates generally a tub structure which includes longitudinal vertical side walls 16 and 17 and end walls 18 and 19. The partition or dividing wall 20 is disposed between the front and rear walls 16 and 17 respectively, and divides the interior of the tub into a washing compartment 21, and a rinsing compartment 22. A perforate drain or drying structure, generally designated as 23, is disposed in extended relation with respect to the end wall 18, and includes a horizontal perforate top wall 24 which is secured to the open upper end of an air conducting duct 25 for conducting heated air through the perforate wall 24 to dry the glasses or other articles which are placed on the drain or drying structure 23.

A horizontal movable carriage, generally designated as 26, is movably mounted on the upper end of the tub 15. The tub 15, at the upper edge thereof, is provided along the front and rear walls thereof with outwardly extending flanges 27 and 28 constituting a trackway and the flanges 27 and 28 have integrally formed therewith channelled or U-shaped edge reinforcing members 29 and 30, respectively.

The horizontal shiftable carrier 26 comprises a top plate or wall 31 which is formed with a front depending flange 32, a rear depending flange 33, and opposite end flanges 34. A plurality of rollers 35 are rotatably carried by the under side of the carriage 26 inwardly of the front and rear flanges thereof, being journalled on stationary shafts 36 which are secured to a pair of inwardly projecting ears 37 formed on the inner sides of the end walls 34. The rollers 35 are adapted to engage on the upper surfaces of the tracks 27 and 28, and preferably the upper leg or side 38 of the front reinforcing member 29 is upwardly offset from the track 27 so as to provide a flange preventing sidewise or forward movement of the front rollers 35. The rear channelled member 30 also has the upper leg 39 thereof upwardly offset from the track 28 to provide a shoulder or flange against which the rear sides of the rear rollers 35 are adapted to engage.

The top plate 31 is provided with a relatively large rectangular opening 40 which is substantially smaller than the plate 31, thereby providing a ledge or shelf 41 at one end of the carrier 26. The opening 40 provides space in the top plate 31 through which the elevator, to be hereinafter described, is adapted to movably engage.

The closure plate 42 is mounted within the top 15 and is of a size sufficient to close a selected one of the compartments 21 or 22. The closure 42 is adapted to have one end thereof overlie the dividing wall 20 in either position of the closure. The closure 42 is slidably mounted on inwardly extending flanges or guides 43 and 44 which are secured to the inner sides of the walls 16 and 17, respectively, adjacent the upper portions of these walls. The closure 42 has fixed to the upper side thereof an elongated toothed rack 45 which extends through the longitudinal center of the closure. A shaft 46 is journalled beneath the carrier 26, being journalled in the front and rear walls 16 and 17, respectively, above the guides 43 and 44.

A gear 47 is fixed centrally on the shaft 46 and a second gear 48 is fixed on the shaft 46 adjacent the front wall 16. A toothed rack 49 is fixed relative to the carrier 26 being supported inwardly of the front flange 32 by supporting bolts or members 50. The rack 49 is adapted to mesh with the gear 48 whereas the rack 45 is adapted to mesh with the gear 47. The racks 45 and 49 are adapted to be oppositely disposed at all times so that when the closure 42 overlies the cleaning compartment 21, the carrier 26 with the rack 49 will overlie the rinsing compartment 22. When the carrier 26 is moved to the right, as viewed in Figure 9, the closure 42 will be shifted to the left so as to overlie the rinsing compartment 22, whereas the carrier 26 will overlie the cleaning compartment 21.

An elevator structure, generally designated as 51, is movably supported relative to the carrier 26 and includes a basket supporting frame 52 which is secured to the lower end of a depending bar 53. The supporting frame 52 is an open frame being formed with a basket seat 54, and a vertically disposed rear flange 55 to which the lower end of the supporting bar 53 is secured. The frame 52 is of a size to loosely engage within the opening 40 and is adapted to have positioned thereon, a wire basket 56 within which tumblers 57, disposed in an inverted position, are adapted to engage. The supporting bar 53 is secured at its upper end by fastening members 58 to a vertically disposed block 59. The block 59 forms part of a vertically movable carriage 60. The carriage 60 includes, as shown in Figure 5, an arcuate plate 61, having opposed pairs of rollers 62 secured to the open side thereof. The rollers 62 movably engage in vertically disposed grooves 63, formed in a vertically disposed supporting post 64. The supporting post 64 is secured at its lower end to a rearwardly projecting boss 65 by means of set screws 66. The supporting post or standard 64 has mounted on the upper end thereof a cap 67 which is secured to the upper end of the standard or post 64, by means of a set screw 68. A forwardly projecting plate 69 is formed integral with or secured to the cap 67 and the plate 69 has formed integral therewith an L-shaped bracket 70. The bracket 70 includes a lower horizontal leg 71 which is downwardly offset by means of a connecting part 72 from the plate 69. A vertically disposed leg 73 extends upwardly from the forward end of the horizontal leg 71 and is braced by means of a bracing web 74. The block 59, at the upper end thereof, has formed integral therewith, an upwardly extending ear or lug 75 which constitutes a clamping jaw and a clamping plate 76 is adapted to confront the lug or clamping member 75, being secured in clamping position by means of fastening members 77 so as to tightly secure one end of a flexible cable 78. The cable 78 is trained over a spirally grooved pulley 79 which is rotatably mounted on a shaft 80. The shaft 80 is disposed between a pair of upwardly extending ears 81 secured to or formed integral with the cap 67. The cable 78 extends through an opening 82 formed in the plate 69 and also extends through an opening 83 formed in the cap 67. The cable 78 is extended downwardly into the interior of the post or standard 64 and has secured to the lower end thereof a cup-shaped slide member 84. The slide member 84 is constantly urged downwardly by means of a spring 85, which has the lower end thereof engaging the slide member 84 and the upper end of the spring 85 bears against the inner side of the cap 67. The cable 78 extends downwardly through the interior of the spring 85. As the carriage 61, which also includes the block 59, is moved downwardly along the post or standard 64, the slide 84 will be pulled upwardly, thereby tensioning the spring 85, this spring constituting a balancing spring for substantially balancing the carriage 59—61 along the length of the supporting post 64.

A brush carrier 86 is disposed below the bracket 70 and has secured thereto an upwardly extending shaft 87. The shaft 87 is slidable through a depending tubular guide 88, which is secured in a forwardly extending arm 89 which may be formed integral with the block or body 59 and upwardly offset therefrom. The brush carrier 86 is adapted to be vertically shifted relative to the horizontally movable carrier 26 by means of an operating lever, generally designated as 90. The operating lever 90 includes a handle 91 which is secured to a U-shaped lever 92 by fastening members 93. The handle 91 is formed with a base 94 which engages a bight 95 of the U-shaped lever 92. The U-shaped lever 92 is formed with the legs thereof having a vertically disposed forward portion 96, a horizontal portion 97, and an obtusely and downwardly inclined rear portion 98. The terminal ends of the rear portions 98, as shown in Figure 5, are each provided with a fork 99 engaging on the opposite sides of a pair of depending lever supporting members 100. The lever supporting members 100 are provided in angle shape and are formed as the opposite legs of a depending U-shaped support which has the bight 101 thereof uppermost and secured by fastening members 102 to the lower side of the plate 69.

The bight or upper plate 101 is formed with an opening 103 registering with the opening 82, and through which the cable 78 movably engages. The forks 99 are rockably mounted on pivot members 104, carried by the lower ends of the arms 100. The brush carrier 86 is connected to the U-shaped lever 92, by means of a pair of links 105. The links 105 are formed with a bifurcated upper end portion 106, engaging on the opposite sides of a horizontal leg portion 97, and secured thereto by means of a pivot member 107. The lower ends of the links 105 are rockably mounted on a horizontally disposed shaft 108 extending through pairs of upwardly projecting ears 109 formed integral with the brush carrier 86.

The carrier 86 and the lever structure 92 are adapted to be held in a depressed position by means of an elongated bar 110 which has the lower end thereof disposed between a pair of ears 111 upstanding from the carrier 86, and disposed between the outer pairs of ears 109. The lower end of the latching bar 110 is pivotally mounted on the shaft 108. The bar 110 is formed with a forwardly offset upper portion 112 having on its rear edge ratchet teeth 113. The upper end of the latching bar 110 is formed with a releasing cam 114, which is adapted to strike the rounded portion 115 of the bracket 70 when the brush carrier is raised to a disengaging position. The cam member 114 is also formed with a right angular latching member 116, which is adapted to engage the outer edge of a plate 117 secured by fastening members 118 to the upper portion of the vertical leg 73 of the bracket 70.

The latching bar 110 is formed with a finger engaging member 119 at its upper end for rocking the bar 110 forwardly to a released position, with respect to the keeper or holding plate 117 in order to permit the carrier 86 to be lowered and to permit the carrier operating lever structure 90—92 to be rocked downwardly. The latching bar 110 is resiliently urged rearwardly by means of an elongated spring 120, which is secured to a plate 121 carried by the forward end of the arm 89. The bar 110 loosely engages through an opening 122 formed in the forward end of the arm 89, and a latch plate or keeper 123 is fixed to the arm 89, in forwardly projecting relation to the rear end of the opening 122 for engagement by the ratchet teeth 113 after the upper portion of the latching bar has been lowered to a point below the bracket 70.

The brush carrier 86 comprises, as is shown in Figure 4, a pair of elongated frame bars 124 disposed in parallel relation and connected together at the opposite ends thereof by connecting members 125. A pair of outwardly divergent extensions 126 extend from the rectangular frame formed by the longitudinal bars 124 and the end bars 125. The carrier 86 has secured to or formed integral with the frame 127 comprising the bars 124, 125 and the extensions 126, a plurality of brush supporting members 128. The brush supporting members 128 comprise a pair of oppositely disposed arms 129 having upwardly tapered opposite end portions 130. The brush supporting members 128 also include oppositely disposed cap members 131 which are circumferentially offset from the arms 129, as shown in Figure 4. The cap members 131 constitute limit means for limiting the insertion of the brush members, generally designated as 132, on the supporting members 128.

Each brush member 132 comprises a split ring 133 which is U-shaped in transverse section, as shown in Figure 13, and which has bristles 134 clamped between the parallel legs 135 thereof. The split ring 133 also is formed integral therewith, with inwardly projecting arms 136 also carrying bristles 134, the arms 136 being disposed in inwardly convergent relation, as shown in Figure 12. The bristles, carried by the inwardly projecting arms 136 are adapted to engage diametrically across the upper side of the tumbler bottom so that this upper side will be cleaned during the immersion of the tumblers in the tub 15.

In order to prevent the horizontal movable carriage 26 from being lifted off of the tracks 27 and 28, I have provided an L-shaped holding member 137, which is secured by fastening members 138 to a forwardly projecting boss 139 carried by the front side of the front flange 32. The lower horizontal side 140 of the holding member 137 is adapted to engage beneath the reinforcing flange 29, as shown in Figure 3.

In the use and operation of this washing machine the tumblers 57 are placed in the basket 56 and this basket placed on the seat 54 of the elevator frame 52. At this time the elevator 51 is in the position shown in Figures 1, 2 and 3. The latching bar 110 is then pulled forwardly to release the latching member 116 from the keeper 117. The lever, including the members 90 and 92, may then be rocked downwardly so that the brushes 132 on the carrier 86 will engage the inverted bottoms of the tumblers 57. The lever may then be rocked downwardly an additional distance thereby forcing the elevator 51 downwardly and at this time the upper end of the latching bar 110 will be below the upper bracket 70. The latching bar 110 will be moved rearwardly to a carrier latching position by means of the spring 120 so as to hold the brushes 132 in firm contact with the inverted bottoms of the tumblers 57. The elevator 51 may be vertically reciprocated in, as an example, the washing compartment 21 and during the vertical reciprocation of the elevator 51, the element will be substantially balanced by means of the balancing spring 85. As the elevator 51 is lowered the slide member 84 will be pulled upwardly thereby placing additional tension on the spring 85, and the cable 78 will move along the spiral groove of the pulley 79. The movement of the cable 78 along the spiral groove 79 is from the small end or diameter of the pulley to the large end or diameter of the pulley as the elevator 51 is being lowered.

After the tumblers have been washed in the washing compartment 21, the carriage 26 may be shifted to the left, as viewed in Figure 9, thereby shifting the closure 42 to a position covering the washing compartment 21. The elevator 51 may then be lowered and reciprocated within the rinsing compartment 22 after which the elevator may be raised to the position shown in Figures 1, 2 and 3. The raising of the elevator 51 toward the uppermost position will effect an initial unlatching of the latching bar 110 as the cam member 114 engages the rounded portion 115 moving the latching bar 110 to the right and out of engagement with the keeper 123, so that during the latter raising of the operating lever the brush carrier 86 will be raised to its uppermost inoperative position and at this time the spring 120 will force the latching bar 110 into engagement with the upper keeper 117. The basket 56, with the tumblers 57 therein, may then be placed on the drier 23. This operation provides for the cleaning of the tumblers without contacting the tumblers with the hands or any drying racks, the tumblers being retained at all times in the basket 56.

In Figures 15 and 16, there is disclosed a modified form of grooved pulley 79a which includes a substantially spiral pulley member 141 which is formed with a cutout 142 which forms a reduced part 143. The pulley member 141 has a groove 144 which terminates at the inner portion of the reduced part 143, and is also formed with oppositely inclined grooves 145 and 146, the latter groove terminating in an opening 147. The face of the pulley member 141 opposite from the grooves 145 and 146 is also formed with a groove 148 extending from the opening 147.

An annular grooved pulley 149 is disposed in face abutting relation to the pulley member 141 and is secured on a cylindrical bushing or sleeve 150 which is press-fitted into the pulleys 141 and 149. An arcuate block 151 is secured to the pulley member 141 by fastening members 152 and is formed with a groove 153 in which the cable 78a is adapted to engage. The cable 78a is trained about the pulley 79a as shown, the reduced part 143 being at the rear and lowermost when the slide 60 is in an uppermost position, and then swinging upwardly, forwardly and downwardly when the slide 60 is lowered. As viewed in Figure 15, the cable 78a is trained from the left upwardly and forwardly over the pulley 149, reverted over the plate 151, passes through the opening 147, downwardly through the grooves 146 and 145, is again reverted over the end 143 and is then trained about the peripheral groove forwardly and downwardly. The pulley 79a may be substituted for the pulley 79 to provide smoother sliding movement for the carriage and the more ready tensioning of spring 85.

I claim:

1. A glassware washing machine comprising a tub, a partition in said tub dividing the latter into a pair of compartments, a closure horizontally slidable in said tub and adapted to close a selected one of said compartments, horizontally shiftable means movably carried by said tub for dipping glassware into a selected compartment, and correlated means carried by said tub, said closure and said first means for shifting said closure oppositely from said first means.

2. A glassware washing machine comprising a tub, a carriage movably carried by said tub, an upstanding supporting post fixed to said carriage, a vertically movable elevator, means slidably supporting said elevator from said post, operating means for said elevator, a balancing spring in said post, a pulley rotatable on said post, and means trained over said pulley and connected to said elevator and said spring for tensioning the latter upon lowering of said elevator.

3. In a glassware washing machine including a tub provided with a pair of compartments and a horizontally shiftable dipping means movable along said tub, a slidable closure adapted to close one of said compartments, and means operable upon shifting of said dipping means in one direction for shifting said closure in the opposite direction.

4. In combination, a tub formed of a pair of compartments, a horizontally movable dipping means carried by said tub, a closure for one of said compartments, guide means for said closure carried by said tub, and means operable by movement of said dipping means in one direction for moving said closure in the opposite direction.

5. In combination, a tub formed of a pair of compartments, a horizontally movable dipping means carried by said tub, a closure for one of said compartments, guide means for said closure carried by said tub, and a shaft rotatably carried by said tub, a pair of gears on said shaft, a gear rack fixed to said closure meshing with one of said gears, and a gear rack fixed to said dipping means meshing with the other of said gears whereby said closure will move oppositely from movement of said dipping means.

ANDERS RUDOLF LOFSTRAND.

REFERENCES CITED

The following references are of record in the file of this patent:

UNITED STATES PATENTS

| Number | Name | Date |
| --- | --- | --- |
| 514,262 | Denton | Feb. 16, 1894 |
| 1,100,858 | Winsor | June 23, 1914 |
| 1,382,683 | Shelton | June 28, 1921 |
| 1,464,294 | Reese | Aug. 7, 1923 |
| 1,514,079 | Gehnrich | Nov. 4, 1924 |
| 1,569,049 | Stufflebeam | Jan. 12, 1926 |
| 1,835,672 | Shank | Dec. 8, 1931 |
| 1,990,894 | Brubaker | Feb. 12, 1935 |
| 1,992,920 | Lofstrand, Jr. | Feb. 26, 1935 |
| 2,052,835 | Lofstrand, Jr. | Sept. 1, 1936 |
| 2,116,155 | Lofstrand, Sr. | May 3, 1938 |
| 2,123,308 | Lofstrand, Sr. | July 12, 1938 |
| 2,183,139 | Hertzberg | Dec. 12, 1939 |
| 2,299,478 | Hoge et al. | Oct. 20, 1942 |